(12) United States Patent
Kraft

(10) Patent No.: US 7,207,611 B2
(45) Date of Patent: Apr. 24, 2007

(54) TOOL HANDLING DEVICE

(75) Inventor: Oliver Kraft, Pfronten (DE)

(73) Assignee: Deckel Maho Pfronten GmbH, Pfronten (DE)

(*) Notice: Subject to any disclaimer, the term of this patent is extended or adjusted under 35 U.S.C. 154(b) by 191 days.

(21) Appl. No.: 10/955,653

(22) Filed: Sep. 30, 2004

(65) Prior Publication Data
US 2005/0077745 A1  Apr. 14, 2005

(30) Foreign Application Priority Data
Oct. 9, 2003  (DE) ................ 203 15 532

(51) Int. Cl.
*B25J 15/00*  (2006.01)
(52) U.S. Cl. .......... 294/106; 294/110.1; 483/902
(58) Field of Classification Search .......... 294/106, 294/110.1, 110.2, 86.4, 113, 114; 414/739; 483/901, 902, 30, 36, 38
See application file for complete search history.

(56) References Cited

U.S. PATENT DOCUMENTS

| 4,072,236 A | * | 2/1978 | Nomura et al. ........... 414/739 |
| 4,457,659 A | * | 7/1984 | Watanabe ............... 414/223.01 |
| 4,546,533 A |   | 10/1985 | Hallbach et al. |
| 4,845,834 A | * | 7/1989 | Watson ................. 483/31 |
| 4,884,332 A | * | 12/1989 | Ozawa et al. ........... 483/44 |
| 5,068,958 A |   | 12/1991 | Kosmowski |
| 5,919,120 A |   | 7/1999 | Pumphrey |
| 6,186,567 B1 | * | 2/2001 | Blick ................... 294/86.4 |

FOREIGN PATENT DOCUMENTS

| DE | 38 16861 A1 | 12/1988 |
| DE | 268 184 A1 | 5/1989 |
| DE | 195 10 498 A1 | 9/1996 |
| EP | 0 227 231 A1 | 7/1987 |
| EP | 1 364 742 A1 | 11/2003 |
| WO | WO 00/62979 A | 10/2000 |

* cited by examiner

*Primary Examiner*—Dean J. Kramer
(74) *Attorney, Agent, or Firm*—The Maxham Firm

(57) ABSTRACT

A tool handling device for a machine tool with a support construction movable along at least two coordinate axes by means of a motor and a gripper arrangement mounted to the support construction. The grippers have two gripper claws pivotable against each other as well as a locking mechanism for fixing the gripper claws in their closed posture. Each gripper has opposed openings for a lateral insertion and extraction of a tool post. Operating elements are provided for pivoting the two gripper claws during the insertion and extraction of a tool post through one of the two openings.

14 Claims, 3 Drawing Sheets

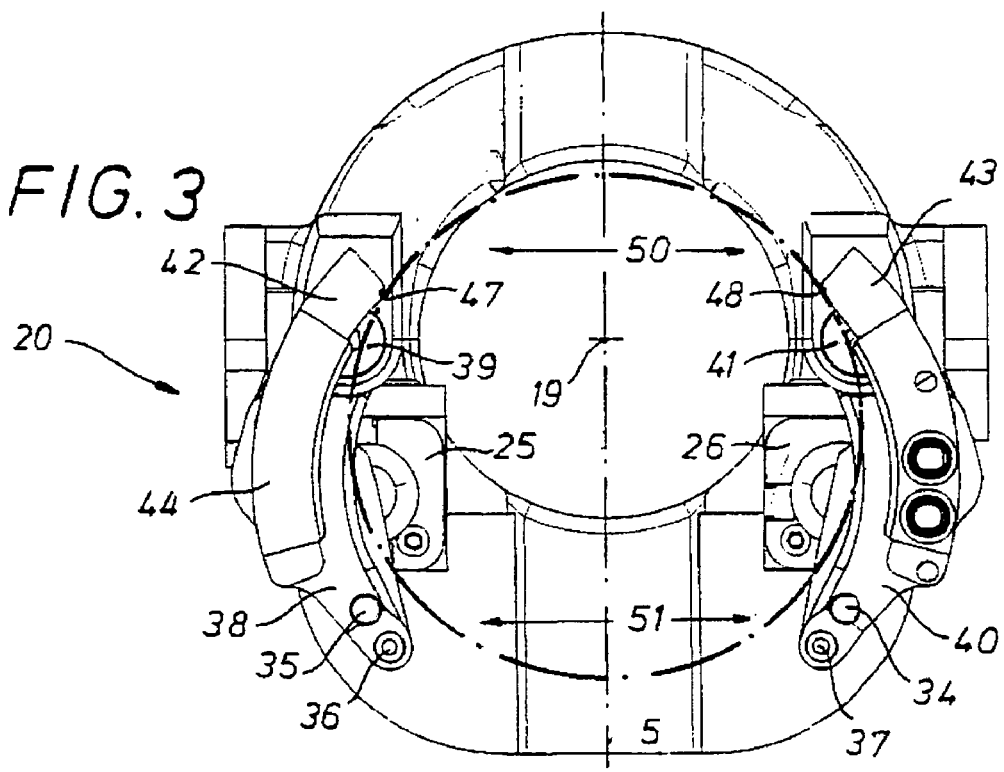
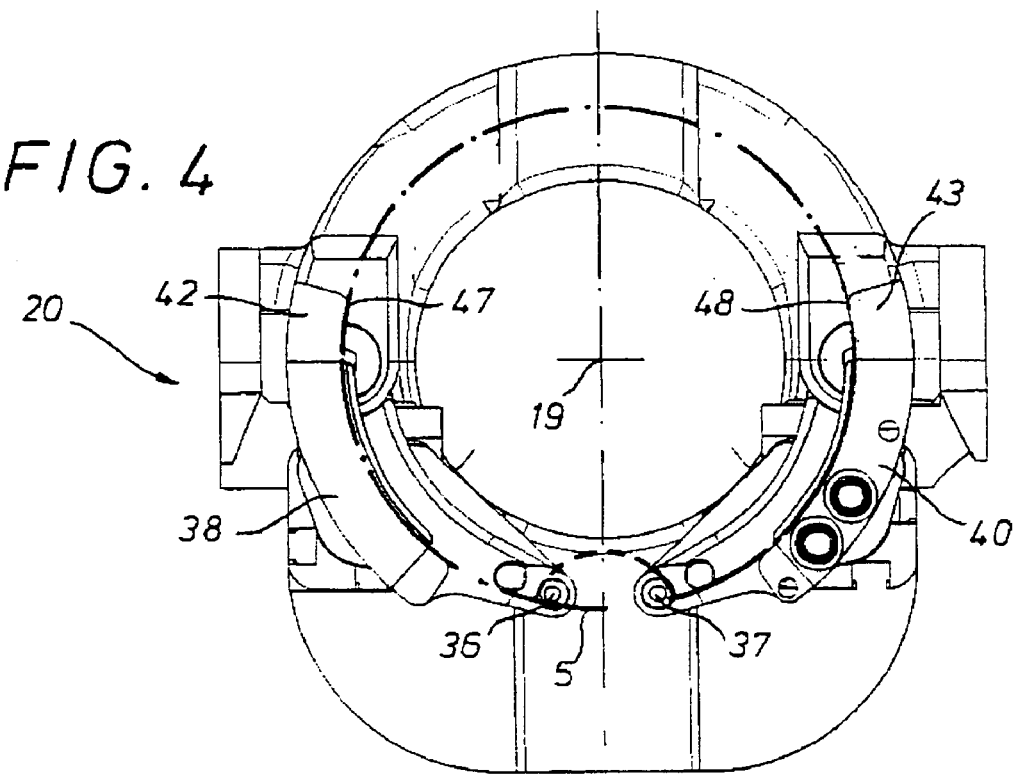

TOOL HANDLING DEVICE

BACKROUND OF THE INVENTION

1. Field of the Invention

The present invention relates generally to machine tools, and more specifically to a tool handling device of a machine tool.

2. Discussion of Related Art

Handling systems are used in connection with tool magazines for machine tools, particularly milling and drilling machines as well as work centers. Various tools may be used. Even though direct tool exchange in the respective work spindle of the machine tool is possible with there handling systems, for example, in accordance the pick-up principle, their preferred field of application is the transport of tools from complex tool magazines to a tool changer, and vice versa.

In so-called "shelf magazines," the tools are disposed in shelves arranged above each other in intervals with their tool posts usually formed as so-called "tool cones." Each shelf contains a plurality of tool accommodations into which the respective tool posts are inserted. In accordance with the work schedule of the machine tool, a tool selected for the subsequent machining operation is approached by the handling system using the shelf position stored in the program. The gripper grips the respective tool post and transports it into a transfer position where the tool post is transferred to a tool changer. If required, the used tool is taken from the tool changer and accommodated in a respective free space in the shelf magazine.

For the above operations different handling systems having various gripper arrangements are known. In all those systems, however, the grippers are only designed for a one-sided access to a tool post. In other words, their gripper claws define a lateral opening through which the tool post is inserted into the gripper and extracted from the gripper in the opposite direction. With this one-sided access capability of the gripper, its movements become complicated if complex magazines are used where, for example, the shelf magazines have a plurality of rows.

SUMMARY OF THE INVENTION

The present invention relates to a tool handling device of a machine tool having a support construction movable in at least two coordinate axes by means of a motor and a gripper arrangement mounted on the support construction. The grippers of the gripper arrangement have two gripping claws pivotable against each other, as well as a latch mechanism for locking the gripping claws in their closed position.

It is one object of the invention to provide a tool handling device for machine tools that enables a more universal utilisation and a reduction of the time required for the tool exchange. According to the invention, this object is achieved by the characterising features of the invention claimed in claim 1.

In the tool handling device according to the invention, the gripper has two diametrically opposed openings for a lateral insertion and extraction of a tool post. In this way a tool post, for example a tool cone, may be inserted into the gripper through its one opening from the one side and extracted through the opening on the other side for a transfer to another device. This other device may be, for example, a tool changer or a work spindle. Since the respective tool post has to be securely held in the gripper during the transfer and transport operations, operating elements for pivoting the two gripper claws of the gripper are provided. They preferably automatically pivot the gripper claws into their closed positions during an insertion or extraction of a tool post through one of the two openings.

Conveniently, an operating element is allocated to each gripper claw. The operating elements may have at least one drive stopper provided on the gripper that protrudes into the lateral moving path of the tool post. The drive stopper is kinematically coupled to at least one gripper claw for its pivoting movement. The operating element is activated during an insertion movement of a tool post into the gripper, as well as by a sliding contact of the ring-shaped collar on the upper end section of the tool post with the drive stopper of the operating element, and the respective gripper claw is pivoted through its kinematic coupling. The same applies to the extraction of a tool post from the gripper. The operating element is activated and possibly pivoted outwards together with the gripper claw for releasing the tool post by a sliding contact of the ring-shaped collar mentioned above with the drive stopper.

The gripper claws may also be pivoted in and out for gripping or releasing a tool post by means of operating elements made up of a drive, for example a pressure cylinder, and at least one sensor for detecting a tool post during its insertion or extraction as well as its presence in the gripper. For controlling such pressure drives conveniently, a machine control is used.

A reliable fastening in the gripper, which is effective even in case of the high inertial forces of possibly heavy tools, may be ensured by a locking mechanism. The locking mechanism may have a pressure cylinder with a respective pin for fixing the respective gripper claw in its closed position. It is particularly advantageous when the locking device has additional components preventing a rotation of the tool post, including its possibly heavy tool even during faster transportation movements. In a preferred embodiment, the locking mechanism has elements for preventing a rotation. These elements are formed as pins that engage with the recesses provided in the uppermost collar of common tool posts when the gripper is closed.

According to a further preferred embodiment of the invention, the gripper arrangement has two diametrically opposed support bodies disposed vertically and symmetrical to their longitudinal axis. The gripper claws, including the operating elements, are pivotably supported in the support bodies. The locking mechanism is also disposed in the support bodies. The support bodies, which are efficiently fixedly connected to each other by means of an upper support plate, form a rigid housing complex with an inner space sufficiently large to accommodate the standardized tool posts. The housing assembly of the gripper arrangement is preferably mounted on the free end of a support arm pivotable by means of a motor. To maintain the rotational position of the gripped tool post during a pivoting movement of the support arm, so that the tool post can be extracted from a shelf space and transferred to a tool exchanger in the same angular position, differential gears are provided to keep the rotational position of the gripper constant or unchanged during the pivoting movements of the support arm.

BRIEF DESCRIPTION OF THE DRAWING

Further particularities and advantages of the invention will become clear from the following description of preferred embodiments, with reference to the drawing, in which:

FIG. 3 is a bottom view of a gripper with opened gripping claws; and

FIG. 4 a bottom view of the gripper according to FIG. 3 with closed gripping claws.

DETAILED DESCRIPTION OF THE PREFERRED EMBODIMENTS

Figures 1, 1A:
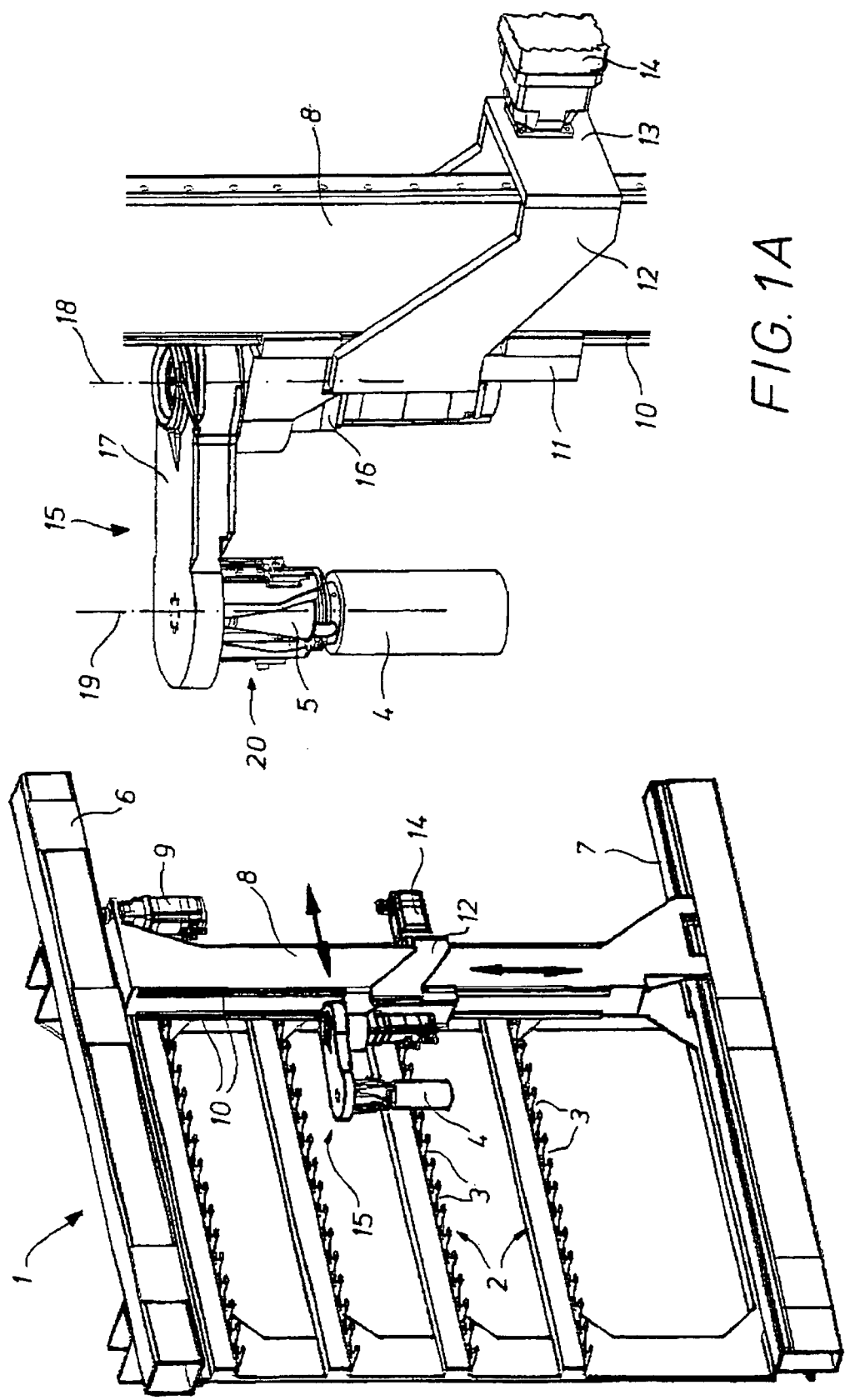
FIG. 1 is a perspective view of a handling device according to one embodiment of the invention together with a single row shelf magazine.
FIG. 1A is an enlarged perspective view of the handling device according to FIG. 1.
Figure 2:
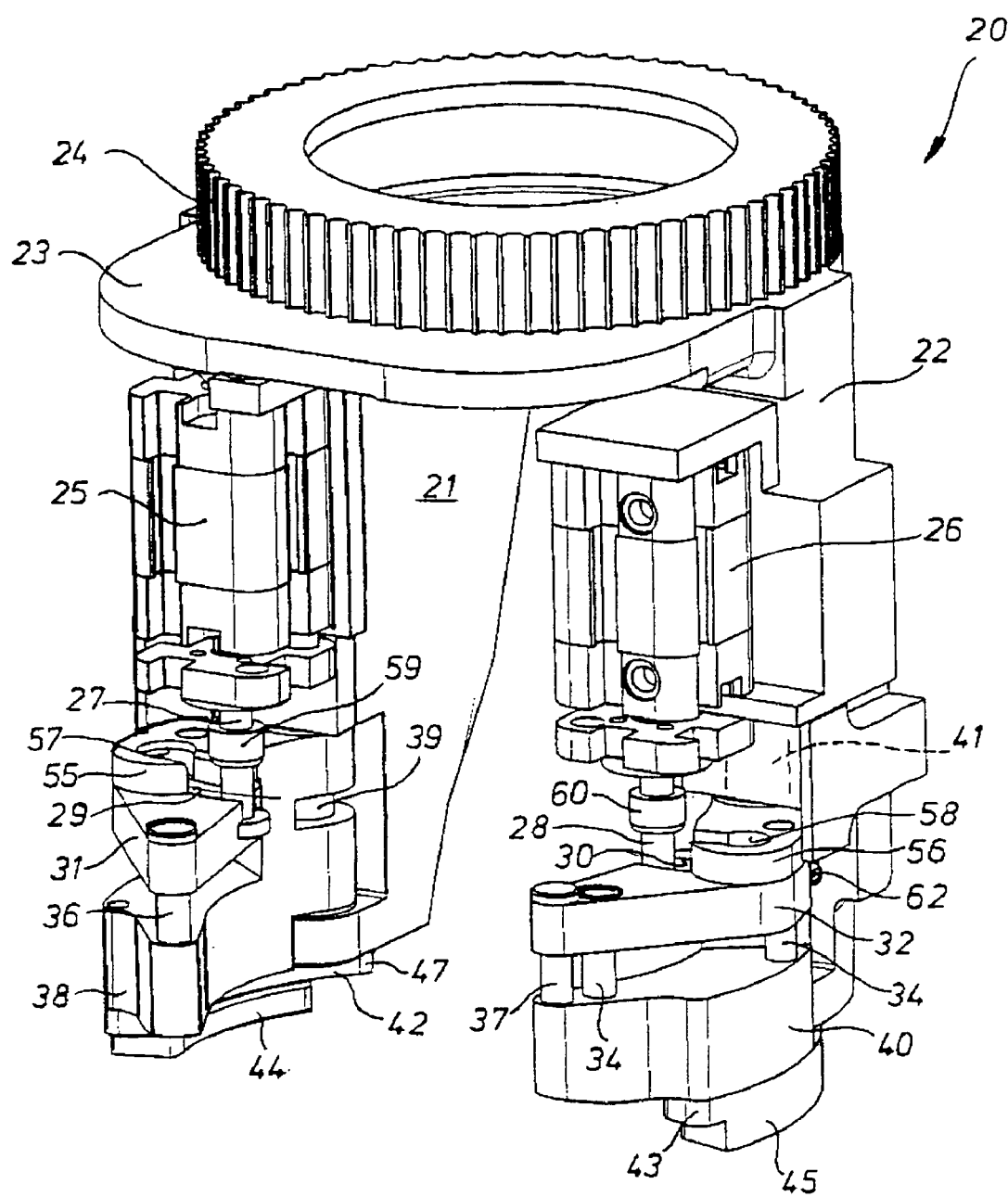
FIG. 2 is a schematic perspective view of the gripper arrangement of the handling device according to FIG. 1.

The system shown in FIG. 1 is designed for an application to work centers as well as program controlled drilling and milling machines. It has shelf magazine 1 which, in this embodiment, has a plurality of semi-circular accommodations 3 open to the front side for tool posts 5, each containing one tool 4 in four horizontal shelves 2, respectively. Shelf 1 is designed as a frame construction and has upper and lower rigid guide rails 6 and 7. In two guide rails 6 and 7, vertical beam 8 is shiftably guided along a horizontal coordinate axis as indicated by a double arrow by means of drive motor 9. On the front side of vertical beam 8, two vertical guide rails 10 are disposed on which slide 11 is guided. Support frame 12 mounted on slide 11 surrounds vertical beam 8 and carries drive motor 14 for the vertical movements along a second coordinate axis in a direction indicated by a double arrow on its rear wall 13. On the front side of slide 11, or of support frame 12, gripper arrangement 15, which is shown in detail in FIG. 1A, is mounted It forms a support construction together with vertical beam 13. Gripper arrangement 15 has a motor 16 mounted axially parallel on vertical slide 11 and pivoting horizontal support arm 17 about its central axis 18. On the free end of pivotable support arm 17, gripper 20, which is described in detail below with reference to FIG. 2, is supported so as to be rotatable about vertical axis 19.

Illustrated gripper 20 has two diametrically opposed support bodies 21 and 22 disposed vertically and axially symmetrical and fixedly connected by upper support plate 23, whereby a stiff and load carrying assembly is formed. On support plate 23, gear wheel 24 is fixed, which is partly overcast by continuous V-belt (not shown) arranged within the cover of support arm 17, and wrapped around a further gear wheel mounted in axis 18 at the end of the support arm. Said cog belt drive ensures that the angular position of gripper 20, as well as the angular orientation of tool post 5 (the tool cone), remain constant during all operations, for example in case of a pivoting movement of support arm 17.

On each support body 21 and 22 a respective cylinder unit 25 and 26 is fixedly mounted which is respectively part of a locking mechanism. Vertically movable piston rod 27 and 28 of the respective cylinder unit 25 and 26 engages with a respective arcuate grove 29 and 30 formed in liftable and lowerable profiled plate 31 and 32 with an end side head. Each profiled plate 31 and 32 is slidably guided on respectively two sliding pins 34 and 35 fixed to the respective support body 21 and 22. At the tapered ends of each plate, pin 36, 37 respectively axially engages with the axial recess in the ring shaped collar of a tool post and, thus, securing the tool cones against a rotation in the gripper (see FIG. 4).

Profiled plates 31, 32 are connected with gripper claws 38, 40 via sliding pins 34, 35 so that they are not rotatable.

The gripper claws 38, 40 are held in support body 21, 22 so as to be pivotable about respective vertical swivel pin 39, 41. Each gripper claw 38, 40 is provided with ring segment shaped fixing element 44, 45 at its lower end portion. This ring segment shaped fixing element 44, 45 engages with the ring shaped grove of a tool cone in the closed state. On ring segment shaped fixing elements 44, 45, ring segment shaped operating elements 42, 43, which are provided with crowned or arcuate stopper edge 47, 48 on their end portion, are integrally formed.

As can be seen in FIG. 3, gripper claws 38, 40, or the ring segment shaped fixing elements attached to their bottom side, define two diametrically opposed openings 50, 51. The width of these openings, indicated by arrows, is greater than the diameter of a conventionally formed cone shaped tool post in the area of its broader ring shaped collar end portion. During the insertion of a tool post through opening 51 into gripper 20, shown in its open position in FIG. 3, the ring shaped collar at the end of cone shaped tool post 5 contacts crowned surfaces 47, 48 of two operating elements 42, 43 in the position indicated by a dot-chain line. In case of a further insertion of tool post 5 in the direction of the arrow in FIG. 3, two operating elements 42, 43 are respectively pivoted to the outside about swivel pins 39, 41 together with their gripper claws 38, 40. With said pivoting movement, the lower parts of gripper claws 38, 40 in FIG. 3 are moved radially inward. A further insertion movement of the ring shaped collar of the tool post into the gripping posture defined by vertical axis 19 causes gripper claws 38, 40 to be pivoted further inward until the closed posture shown in FIG. 4 is reached. A corresponding effect is obtained if the tool post is inserted through upper opening 50 in FIG. 3, since in this case as well the upper cone shaped end of the ring shaped collar moves into a sliding pressure contact to two arcuate surfaces 47, 48. Therefore, operating elements 42, 43 are pivoted about swivel pins 39, 41 together with gripper claws 38, 40.

In the closed position shown in FIG. 4, two gripper claws 38, 40 are secured against an arbitrary opening in the following way. As can be seen in FIG. 2, a respective further plate element 55, 56 extending as a prolongation of accommodation slits 29, 30 and comprising respective recess 57, 58 having a circularly widened end portion is disposed above two profiled plates 31, 32. Plate elements 55, 56 follow the pivoting movements of gripper claws 38, 40 so that rods 27, 28 of cylinder units 25, 26 are moved up to the circular end parts of said recesses 57, 58, into a pressure contact with ring shaped collar 59, 60 respectively provided on piston rod 27, 28 during their closing movement.

By supplying pressure oil to cylinder units 25, 26, piston rods 27, 28 are extended downwards, and respective profiled plate 31, 32 is pushed downwards by the positive engagement of the widened piston head. This results in an extension of pins 36, 37 engaging with the recess provided in the respective ring shaped collar of tool post 5, thereby securing the tool post against a rotation as indicated in FIG. 4.

The invention is not limited to the illustrated embodiment. For example, other suitable means may be used instead of the mechanical operation of gripper claws 38, 40 carried out with the aid of operating elements 42, 43 and their arcuate surfaces 47, 48. One possibility is, for example, the provision of one or more sensors detecting the presence of a tool post and activating drive elements opening or closing the gripper claws. To open gripper claws 38, 40 and to release tool post 5 after the relief of cylinder units 25, 26 spring systems may be used, spring 62 being indicated in FIG. 2 for this purpose.

What is claimed is:

1. A tool handling device of a machine tool, said tool handling device comprising:
   a support construction movable along at least two coordinate axes by means of a motor;
   a gripper arrangement mounted on the support construction, said gripper arrangement comprising:
      two gripper claws pivotable with respect to each other;
      a locking mechanism for fixing the gripper claws in their closed posture; and
      two diametrically opposed openings for a lateral insertion and extraction of a tool post; and
   operating elements provided for pivoting the two gripper claws during the insertion and extraction of a tool post through one of the two openings, at least one drive stopper being provided on the operating elements, said at least one drive stopper protruding into a lateral moving path of the tool post and being kinematically coupled with at least one gripper claw for its pivoting movement, the respective operating element being formed as an arcuate segment on the allocated gripper claw and having the drive stopper formed at its one end.

2. The tool handling device according to claim 1, wherein an operating element is allocated to each gripper claw.

3. The tool handling device according to claim 2, wherein the locking mechanism comprises at least one pressure cylinder respectively including a vertically extensible piston rod and a ring-shaped collar formed thereon.

4. The tool handling device according to claim 3, wherein the locking mechanism further comprises elements for preventing a rotation of the tool post.

5. The tool handling device according to claim 2, wherein the gripper further comprises two diametrically opposed support bodies disposed in an axially symmetrical position in which the gripper claws, including the operating elements, are pivotably supported and the locking mechanism is mounted.

6. The tool handling device according to claim 5, wherein the two support bodies are fixedly connected to each other by an upper support plate and the gripper is rotatable about its vertical center axis.

7. The tool handling device according to claim 6, further comprising:
   a support arm with a free end to which the gripper is mounted such that said support arm is pivotable by means of the motor; and
   differential gears which keep the rotational posture of the gripper constant during pivoting movements of the support arm.

8. The tool handling device according to claim 7, further comprising spring elements, wherein the gripper claws can be moved into their open postures against the force of the spring elements by means of the operating elements and the spring elements bias the gripper claws in the closing direction.

9. The tool handling device according to claim 1, wherein the locking mechanism comprises at least one pressure cylinder respectively including a vertically extensible piston rod and a ring-shaped collar formed thereon.

10. The tool handling device according to claim 1, wherein the locking mechanism further comprises elements for preventing a rotation of the tool post.

11. The tool handling device according to claim 1, wherein the gripper further comprises two diametrically opposed support bodies disposed in an axially symmetrical position in which the gripper claws, including the operating elements, are pivotably supported and the locking mechanism is mounted.

12. The tool handling device according to claim 11, wherein the two support bodies are fixedly connected to each other by an upper support plate and the gripper is rotatable about its vertical center axis.

13. The tool handling device according to claim 1, further comprising:
   a support arm with a free end to which the gripper is mounted such that said support arm is pivotable by means of the motor; and
   differential gears which keep the rotational posture of the gripper constant during pivoting movements of the support arm.

14. The tool handling device according to claim 1, further comprising spring elements, wherein the gripper claws can be moved into their open postures against the force of the spring elements by means of the operating elements and the spring elements bias the gripper claws in the closing direction.

* * * * *